United States Patent
Bertin et al.

[15] 3,648,620
[45] Mar. 14, 1972

[54] FLUID GROUND EFFECT VEHICLE TRANSPORTATION SYSTEM

[72] Inventors: Jean Henri Bertin, Neuilly-sur-Seine; Marcel Pierre Le Nabour, Limonest; Francois Louis Giraud, Plaisir, all of France

[73] Assignee: Bertin & Cie, Plaisir, France

[22] Filed: Dec. 24, 1969

[21] Appl. No.: 887,922

[30] Foreign Application Priority Data

Dec. 24, 1968  France.....................................180548
Jan. 31, 1969  France...................................6902066

[52] U.S. Cl.............................105/63, 104/23 FS, 104/155, 105/1 A, 105/133, 105/145
[51] Int. Cl......................B60v 1/08, B60v 3/04, B61c 7/00
[58] Field of Search.................104/23 FS, 155; 105/63, 64 J, 105/133, 145

[56] References Cited

UNITED STATES PATENTS 3,013,505  12/1961  Burke, Jr. .............................104/155 X
3,190,235  6/1965   Bertin et al. ........................104/155 X Primary Examiner—Arthur L. La Point
Assistant Examiner—Howard Beltran
Attorney—Stevens, Davis, Miller & Mosher

[57] ABSTRACT

A pressure fluid supply facility for the cushions of a ground effect machine or vehicle, the facility comprising at least one fluid generator connected to the inducing nozzles of static pumps whose flow resulting from the mixing of the inducing flow with the induced fluid energizes the lift cushions and guide cushions of the machine, wherein each cushion is associated with at least one static pump disposed very near the cushion so as to reduce the pressure losses in the resulting flow by reduction of duct length.

6 Claims, 14 Drawing Figures

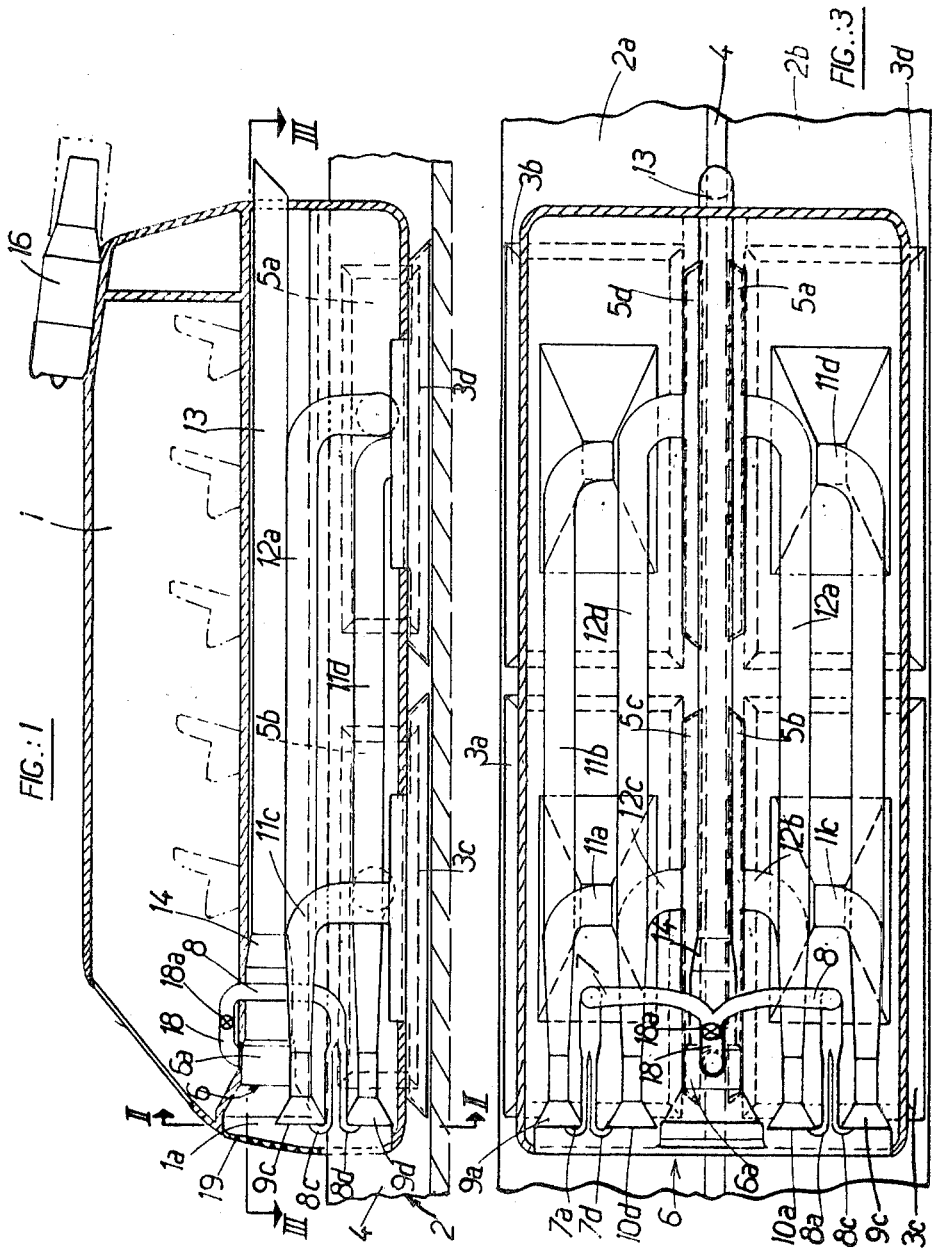

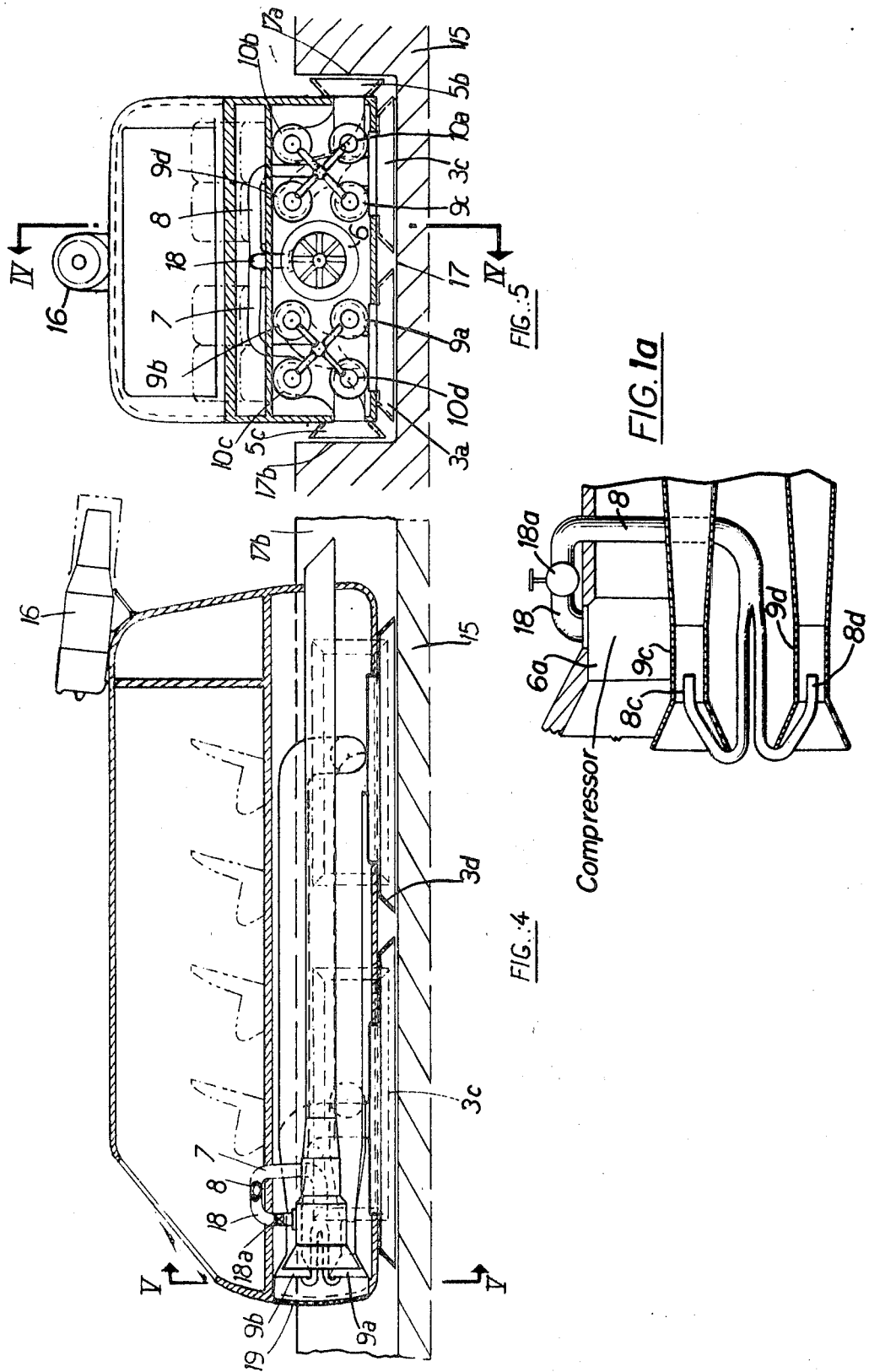

Patented March 14, 1972
3,648,620
6 Sheets-Sheet 3
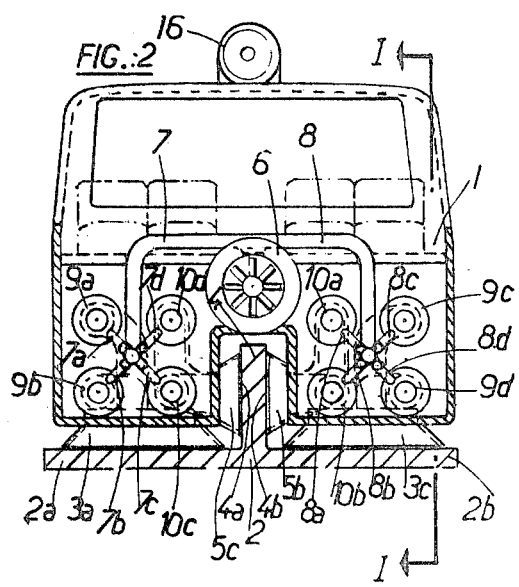
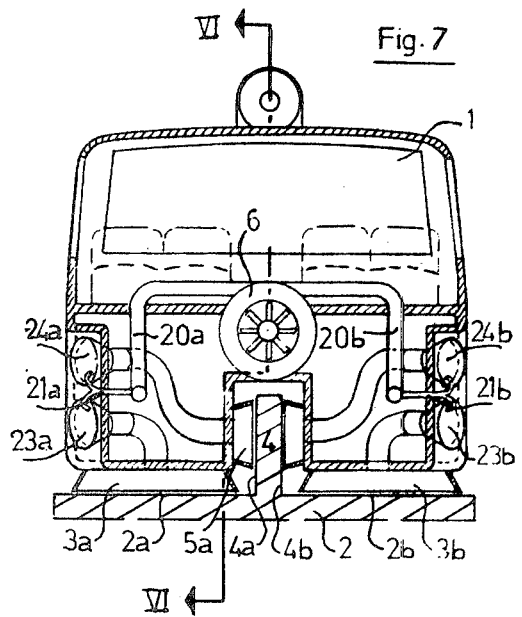
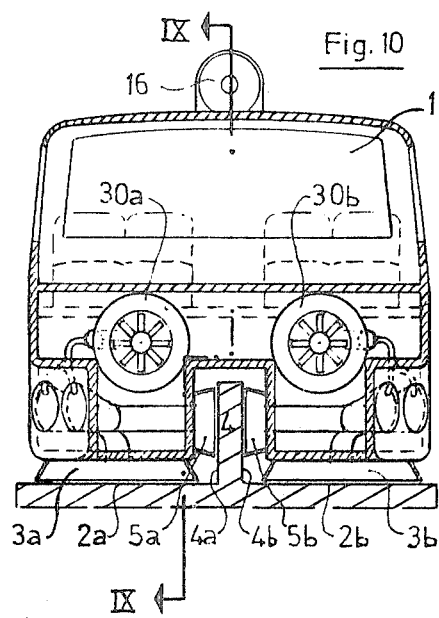

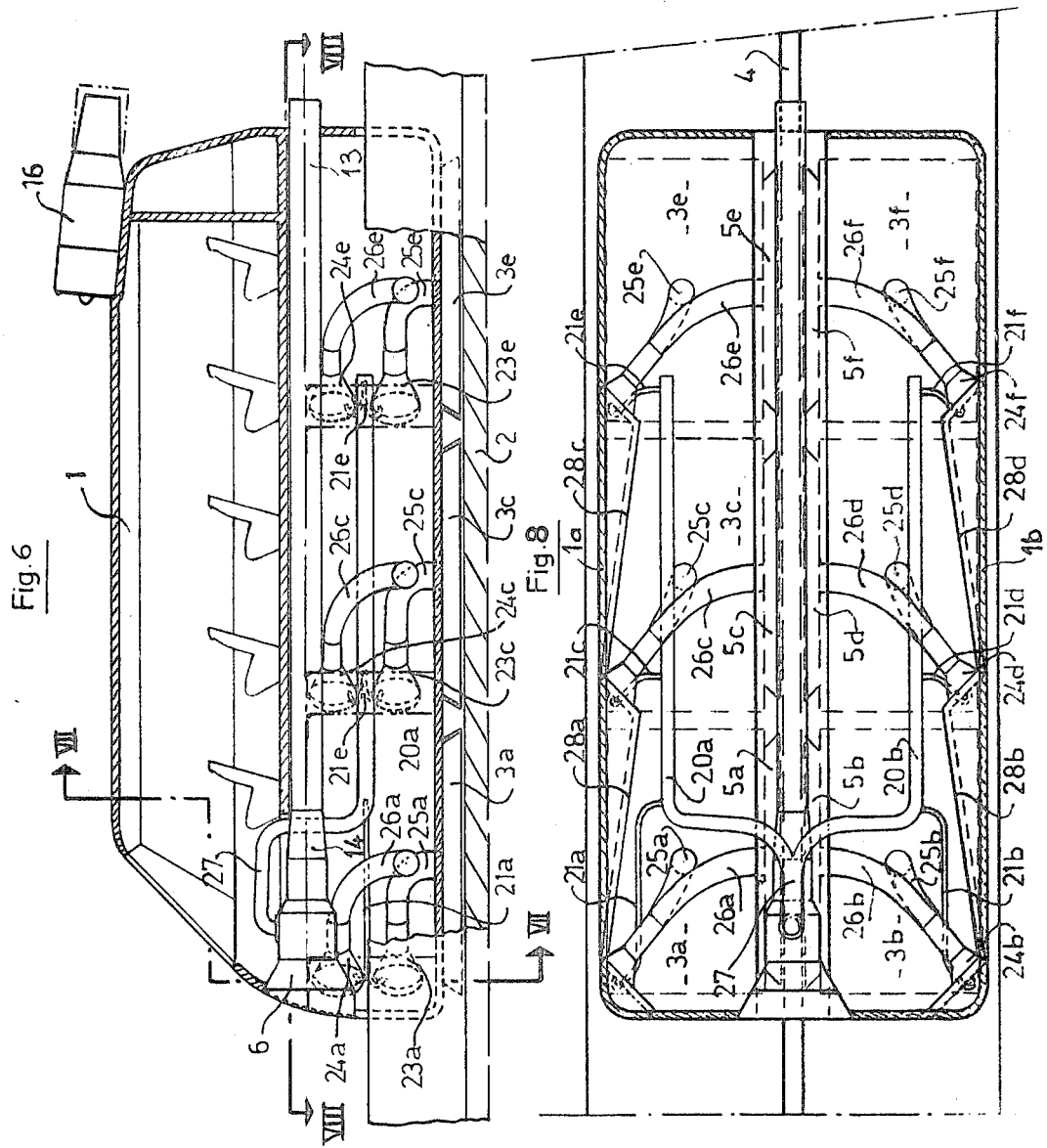

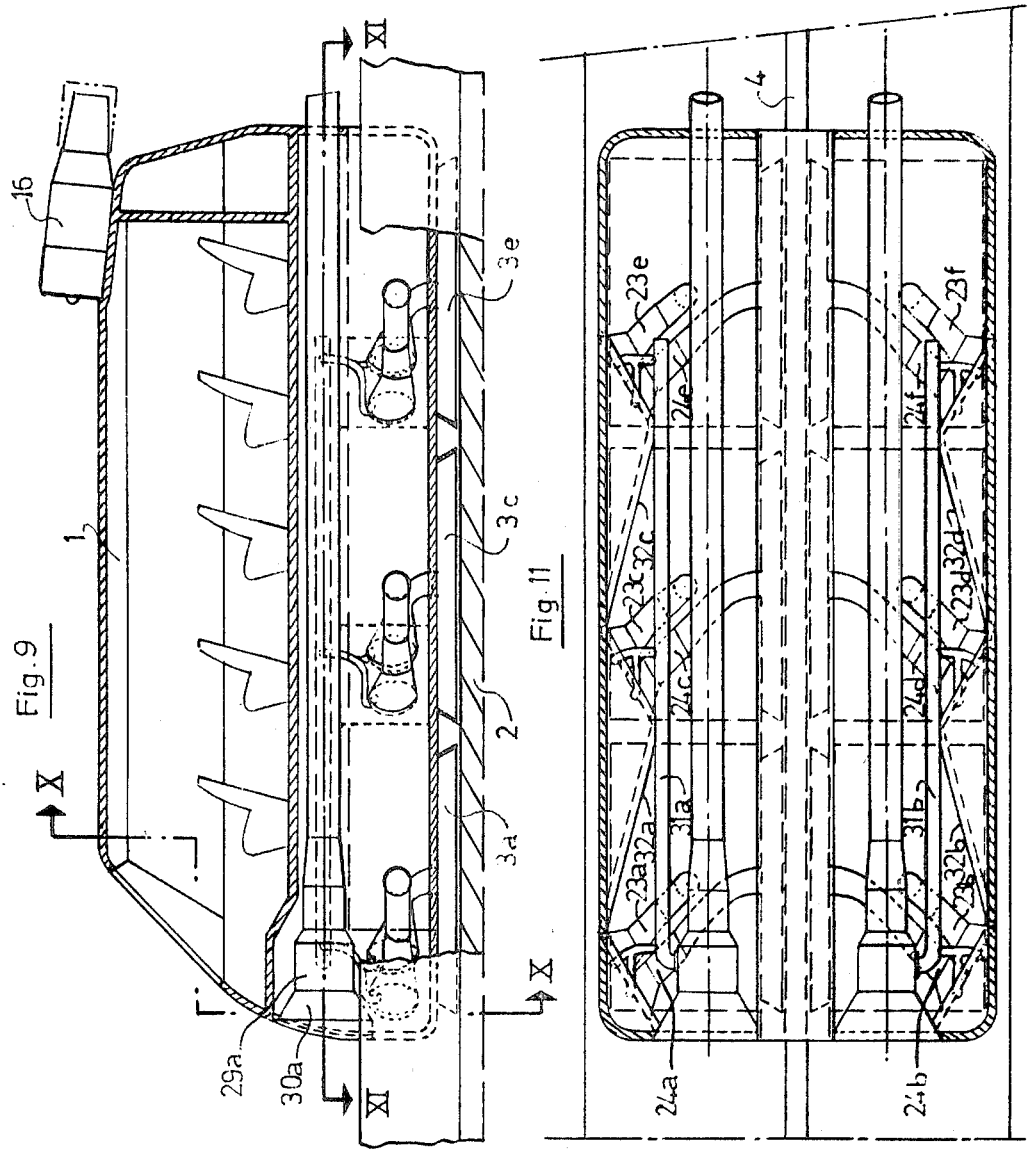

FLUID GROUND EFFECT VEHICLE TRANSPORTATION SYSTEM

This invention relates to a static pump type supply facility for the pressure fluid energized cushions of a ground effect machine or vehicle borne and/or guided along a prepared way which can have in cross section the shape of an inverted T or of a U or any other shape such that the machine can be borne and/or guided along the way.

The advantage os such a system is that it can provide, from a small inducing flow produced by a small device, a flow which results from the inducing flow mixing with the induced flow and which can energize the machine cushions.

The inducing flow can be supplied by a pressure fluid generator; alternatively and advantageously, some pressure fluid can be bled from the output of the first stage of a compressor or of a turbojet engine or of a turboprop engine which can also be used as an auxiliary drive element when the machine is traveling at high speed.

The static pumps used comprise e.g., a convergent part which collects the induced flow from the ambient medium and which has at its exit a number of nozzles through which the inducing flow goes, vehicling with it into a mixer the induced flow, to which the inducing flow imparts kinetic energy. A diffuser downstream of the mixer collects the resulting flow and converts its kinetic energy into pressure energy for energizing the machine cushion.

According to a feature of the invention, the static pumps can be placed at the front of the machine so that when the same travels fast, the induced flow reaches the convergent part of the static pump at a relative velocity equal to the speed of the machine. Since the induced flow already has some kinetic energy before passing into the static pump, this feature helps to increase system efficiency. When the machine or vehicle is traveling fast enough, the inducing flow ceases to be a predominant element and its rate of flow can be reduced, e.g., by at least one valve disposed on the duct energizing the nozzles. Indeed, the inducing flow can be cut out at high speed by closing the valve, since the induced flow then has sufficient kinetic energy to energize the machine or vehicle lift and/or guide cushions. The valve can be controlled automatically by a facility for sensing vehicle speed and/or the positive pressure in front of the vehicle.

If the facility supplying pressure fluid to the inducing nozzles does not have any drive function, such facility can be cut out of operation once the machine is traveling fast enough.

Each static pump can energize one or more pressure fluid cushions. There is a common inducing flow supply for all the static pumps.

As an improvement according to the invention, the static pumps are placed near the cushions which they energize so that each bearing and/or guide cushion is associated with a corresponding pump; this feature reduces pressure losses by reducing the length of the lines connecting a static pump to a cushion.

According to a feature of the invention, the static pumps are disposed in at least one edge groove of the machine frame, advantageously near each fluid cushion and, advantageously, at an inclination to the normal direction of machine travel, so as to be able to receive the dynamic pressure of an induced flow of an amount which is a fraction of the induced flow of the static pumps, but without appreciably disturbing the flow of ambient fluids along the machine or vehicle outer walls. Accordingly, the convergent intake of the static pumps are embedded in the machine frame, which comprises inclined walls channeling the ambient fluid towards the static pumps, the system being such that there is no disturbing interaction between the convergent inlets of contiguous static pumps.

The static pumps are embedded in an edge recess of a cavity extending along the central longitudinal axis of the machine or vehicle.

In the accompanying drawings:

FIG. 1 is a longitudinal section taken on the line I—I of FIG. 2 of a pressure fluid cushion machine according to the invention;

FIG. 1a is a larger scale fragmentary sectional view of the front part of FIG. 1, illustrating the static pump system;

FIG. 2 is a cross section taken on the line II—II of FIG. 1;

FIG. 3 is a longitudinal section taken on the line III—III of FIG. 1;

FIG. 4 is a longitudinal section taken on the line IV—IV of FIG. 5 of another form of the invention;

FIG. 5 is a cross section taken on the line V—V of FIG. 4;

FIG. 6 is a longitudinal section taken on the line VI—VI of FIG. 7 of an improved variant of the invention;

FIG. 7 is a cross section taken on the line VII—VII of FIG. 6;

FIG. 8 is a longitudinal section taken on the line VIII—VIII of FIG. 6;

FIG. 9 is a longitudinal section taken on the line IX—IX of FIG. 10 of another variant according to the invention;

FIG. 10 is a cross section taken on the line X—X of FIG. 9;

FIG. 11 is a longitudinal section taken on the line XI—XI of FIG. 9;

Figure 12:
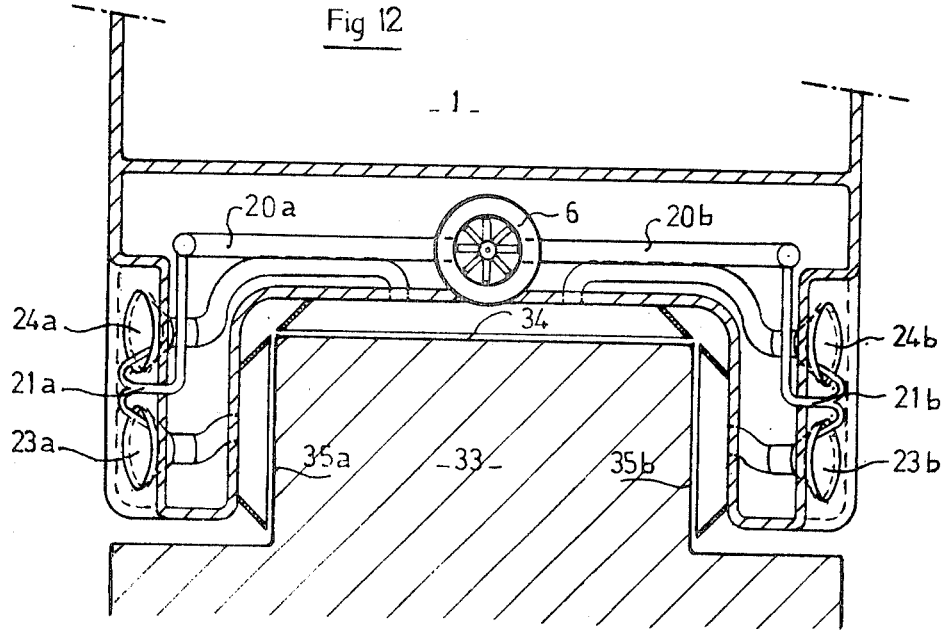
FIG. 12 is a cross section taken of a third variant according to the invention.

Referring to FIGS. 1, 2 and 3, a machine or vehicle 1 cooperates with an inverted T-section way 2 comprising bearing parts 2a, 2b and a central guide extension 4, the cooperation being by way of pressure fluid lift cushions, as 3a, 3b, 3c and 3d, and guide cushions, as 5a, 5b, 5c and 5d, disposed opposite surfaces 4a, 4b of extension 4.

A compressor 6a of a turbojet engine 6 mounted on the machine or vehicle delivers to a duct 18. The same delivers pressure fluid to ducts 7, 8; via ducts 7a, 7b, 8c, 8d, pressure fluid is injected from ducts 7, 8 into static pumps 9a, 9b, 9c, 9d energizing lift cushions 3a, 3b, 3c, 3d respectively via respective ducts 11a, 11b, 11c, 11d. Pressure fluid is injected similarly, also from ducts 7, 8 and via ducts 7c, 7d, 8a and 8b, into static pumps 10a, 10b, 10c, 10d which deliver to guide cushions 5a, 5b, 5c, 5d respectively via respective ducts 12a, 12b, 12c, 12d.

Via a nozzle 14 and a duct 13, the pressure fluid from the turbojet which is not used by the static pumps can help to drive the machine. The main driving power can be provided by a turbojet 16 positioned at the rear of the machine. Of course, the number of static pumps, lift cushions and guide cushions is not limitative.

The static pumps are disposed at the front of the machine opposite an aperture 1a which is disposed in the machine wall and which is protected by a grating or the like 19. The rate of pressure fluid flow through duct 18 can be reduced down to zero by a valve 18a operable by the machine driver through appropriate means (not shown).

In operation, the static pumps energize the cushions at low speeds of the machine, the valve 18a being open. Most of the drive is provided by the turbojet 16. When the machine is traveling at high speeds, valve 18a is closed and so the inducing flow in the static pumps ceases, the cushions being energized by the external fluid, which enters the static pumps with adequate kinetic energy. The turbojet 6 serves as an auxiliary drive element at high speeds. The valve 18a can have a number of intermediate positions. Another possibility is to control the starting and stopping of the turbojet 16 directly instead of using a valve as 18a. An automatic facility which controls the valve 18a and which senses the positive pressure in front of the machine and can control the speed thereof can also be provided.

Referring to FIGS. 4 and 5, the static pump energization system is similar to FIGS. 1-3, and the machine 1 moves on a U-shaped way 15 having a bearing surface 17 and lateral guide arms or flanges 17a, 17b. To simplify matters, elements common to this embodiment and to the embodiment shown in FIGS. 1-3 have like references. The machine has lift cushions 3a, 3b, 3c, 3d and guide cushions 5a, 5b, 5c, 5d. Compressor 6 delivers to a duct 18 via which pressure fluid reaches ducts 7, 8. The pressure fluid is injected into static pumps 9a, 9b, 9c, 9d energizing the lift cushions 3a, 3b, 3c, 3d and into static pumps 10a, 10b, 10c, 10d energizing the guide cushions 5a, 5b, 5c, 5d. The drive for the machine is provided by a turbojet engine 16. The static pumps are placed at the front of the machine opposite an aperture fitted with a protective grating 19. The rate of pressure fluid flow through duct 18 can be controlled by a valve 18a. This embodiment operates in just the same way as the embodiment shown in FIGS. 1–3.

In the improved variant shown in FIGS. 6–8, the compressor of turbojet 6 delivers to a duct 27 which delivers to ducts 20a, 20b. Duct or line 20a delivers pressure fluid to two-way connectors 21a, 21c, 21e which inject the pressure fluid into static pumps 23a, 23c, 23e and 24a, 24c, 24e energizing, by way of respective ducts 25a, 25c, 25e and 26a, 26c, 26e, the lift cushions 3a, 3c, 3e and the guide cushions 5a, 5c, 5e. In the same way and, with advantage, from the duct 27 and via a duct or line 20b, pressure fluid is injected into two-way connectors 21b, 21d, 21f which inject the pressure fluid into static pumps 23b, 23d, 23f and 24b, 24d, 24f energizing, by way of respective ducts 25b, 25d, 25f and 26b, 26d, 26f, lift cushions 3b, 3d, 3f and guide cushions 5b, 5d, 5f. Pumps 23d, 23f are masked by pumps 24d, 24f (FIG. 8).

The static pumps are disposed at the edge walls 1a, 1b of the machine 1 near each lift and guide cushion, a guide cushion pump and a lift cushion pump being disposed one above another in a plane substantially parallel to the machine longitudinal center-plane. Through the agency of inclined walls 28a, 28b, 28c, 28d, the pumps 23c and 24c, 23d and 24d, 23e and 24e, 23f and 24f, respectively, can be supplied with induced fluid. Preferably, the angle of inclination of the walls 28a, 28b, 28c, 28d stays within the normal limits of a conventional divergency to preclude detachment of the boundary layer. Safety gratings (not shown) can be placed in front of each pump. The facility for supplying the static pumps with inducing flux has a valve system identical to what has been hereinbefore described.

Referring to FIGS. 9–11, the static pumps are supplied by two compressors 29a, 29b associated with respective turbojets 30a, 30b identical to turbojet 6. Pressure fluid is supplied through ducts 31a, 31b to the pump inducers, which are disposed respectively on either side of the machine longitudinal center-plane. A lift cushion pump and a pump supplying the associated guide cushion are disposed in side-by-side relationship at the same level as one another relatively to the bearing surface of the way. The static pumps can be supplied with ambient fluid by way of inclined walls 32a, 32b, 32c, 32d.

Referring to FIG. 12, the pump supply system is the same as in FIGS. 6–8, but the machine 1 moves on a way 33 in cross section having substantially the shape of an inverted U, comprising a bearing surface 34 and lateral guide arms or flanges 35a, 35b.

Figure 13:
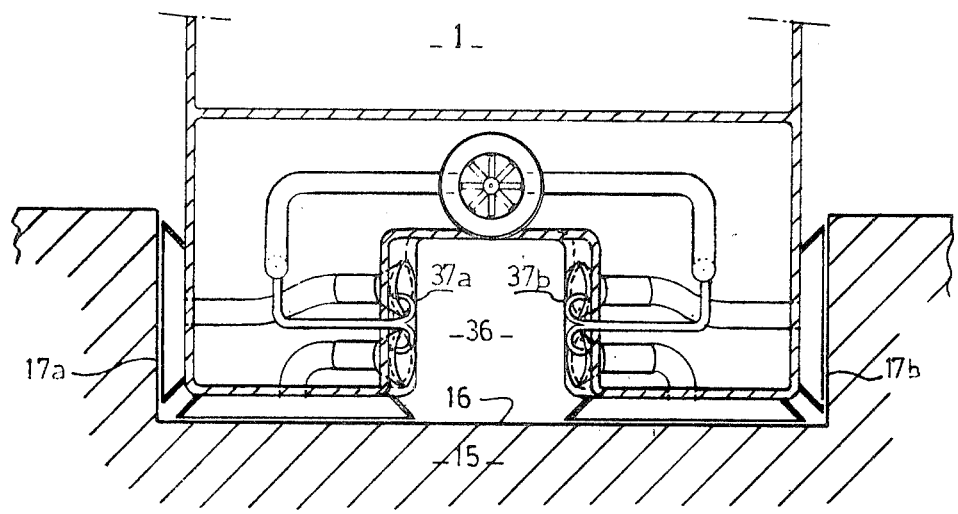
FIG. 13 is a cross section taken of a fourth variant according to the invention.

Referring to FIG. 13, the pump supply system is as for FIG. 12, but the machine 1 moves on a way 15 which in cross section is substantially U-shaped comprising a bearing surface 16 and side arms or flanges 17a, 17b. The lift and guide cushion pumps are disposed in edge recesses 37a, 37b of a hollow interior 36 extending along the machine longitudinal center axis and are disposed one above another in a plane extending substantially parallel to the machine longitudinal center-plane.

We claim:

1. A ground effect vehicle movable along a surface with the interposition of a fluid cushion system, comprising an injector-type static pump having a duct with an upstream ramming air-intake section facing towards the front of the vehicle and a downstream pressure fluid discharge section communicating with said fluid cushion system to feed the same, and means for controlling the flow of fluid to said nozzle means.

2. A ground effect vehicle as claimed in claim 1, further comprising a gas-turbine unit designed for the propulsion of said vehicle and having a multistage air compressor, and piping means for tapping compressed air from the first stage of said compressor to feed said nozzle means.

3. A ground effect vehicle as claimed in claim 1, wherein said fluid cushion system comprises a plurality of individual pressure fluid cushions, and an injector-type static pump is associated with each of said cushions and extends adjacent the same, each static pump having an air-intake section opening on to a side of said vehicle.

4. A ground effect vehicle as claimed in claim 3, wherein said air-intake section opens into a recess in said vehicle side, said air-intake section being convergent.

5. A ground effect vehicle as claimed in claim 4, wherein each side recess has walls which extend at an inclination to the longitudinal axis of said vehicle, from the air-intake section of one static pump to the air-intake section of the next adjacent static pump.

6. A ground effect vehicle as claimed in claim 1, wherein said fluid cushion system comprises a lift cushion formed under said vehicle and a guide cushion formed sidewise of said vehicle, and said injector-type static pump comprises two branching pressure fluid discharge sections communicating respectively with said lift cushion and said guide cushion.

* * * * *